Oct. 22, 1963 F. L. KATZMANN 3,108,204
READ-OUT INJECTION AND POLARITY INVERSION
Filed Aug. 15, 1960
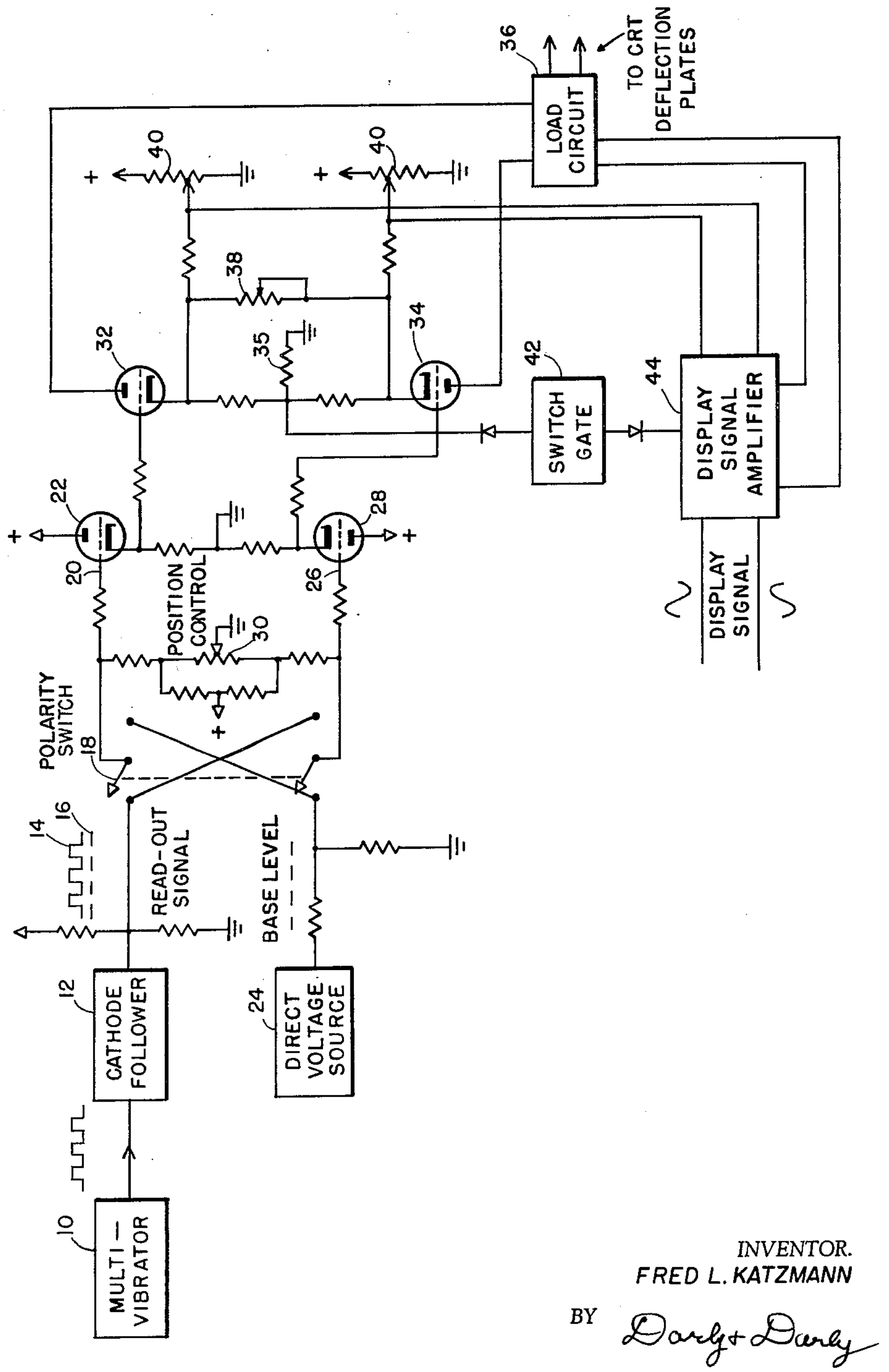
INVENTOR.
FRED L. KATZMANN
BY Darby & Darby
ATTORNEYS 3,108,204

READ-OUT INJECTION AND POLARITY INVERSION

Fred L. Katzmann, Cedar Grove, N.J., assignor to Fairchild Camera and Instrument Corporation, Syosset, N.Y., a corporation of Delaware Filed Aug. 15, 1960, Ser. No. 49,723
9 Claims. (Cl. 315—23)

This invention relates to direct coupled paraphase amplifier circuits and particularly to a novel circuit which combines separately controlled single-ended unsymmetrical input voltages in a symmetrical balanced amplifier configuration to produce symmetrical outputs.

The usual balanced symmetrical amplifier utilizes two circuit portions in a push-pull arrangement to amplify input signals which are equal but oppositely phased with respect to a common reference point. The signals are then effectively added together in an aiding relationship at the output to provide substantially double the signal amplitude that would be achieved with a single-ended stage. This type of amplifier has found many applications and is particularly useful in the oscillography art, for example, for providing sufficient driving voltages at the deflection plates of a cathode ray tube. However, the normal configuration has been limited to the use of symmetrical input signals only.

In certain other oscillography applications it is desirable to display signal voltage of either polarity with respect to a reference or direct voltage bias level. In general it has been difficult to separate these two types of voltage information so that each may be controlled independently of the other while being displayed together. A particular requirement for such a device is found in connection with the subject of a copending application entitled "Direct Read-out System for Oscilloscopes," Serial No. 34,124, filed June 6, 1960, in the name of Bernard L. Hegeman and assigned to the same assignee as the instant application.

In that case, reference or read-out dots are generated and superimposed, on a time sharing basis, with the normal push-pull type signal display so that direct read-out measurements between the dots indicate signal rise-time and other characteristics. The dots are independently positionable with respect to a direct voltage base level which is also adjustable. In addition, the polarity of the display may be reversed for measurement of oppositely phased signals. This read-out system thus requires a device which combines unsymmetrical input signals in a balanced circuit to produce symmetrical outputs. Such an effect is made possible by use of the novel direct coupled symmetrical paraphase amplifier circuit, which is the subject matter of the instant application.

In the past, paraphase amplifiers have utilized two cathode coupled circuit sections, with input signal being applied to the grid of only one section while the other input electrode was grounded, to provide symmetrical push-pull type output signal at the plates. However, that circuit could not meet the novel symmetrical input circuit requirements of the instant application.

It is, therefore, the principal object of the instant invention to provide a simplified symmetrical circuit for combining unsymmetrical independently adjustable signal and reference voltages.

It is another object of this invention to utilize a balanced symmetrical direct coupled paraphase amplifier which combines independent unsymmetrical signal and reference voltages at the inputs to provide push-pull type symmetrical outputs.

An additional object is to provide a novel direct coupled paraphase amplifier which permits utilization and measurement of signals of either polarity.

The instant invention utilizes a novel completely symmetrical balanced direct coupled paraphase amplifier which combines two unsymmetrical single-ended input signals to provide a push-pull type symmetrical output. An adjustable direct voltage base level signal is inserted into one half of the circuit and an alternating voltage or read-out dot generating signal, which also varies with respect to a direct voltage reference level, is inserted into the other half. Due to cathode coupling between the two sections, the two signals are combined at the output plates in a balanced push-pull relationship with respect to a common reference point or ground. The combined signal is then superimposed or mixed with the normal display signal, on a time sharing basis, before being applied to the plates of the cathode ray tube for display on the face of the tube. In addition, a phase inversion switch is utilized to facilitate measurements of signals of opposite polarity. Thus, each of the symmetrical paraphase amplifier portions may accommodate an input of either direct or alternating voltages. Further details concerning the theory of operation of paraphase amplifiers may be found in "Electron Tube Circuits," by Samuel Seely, 1950 edition, pages 117 and 187–189.

The detailed description and accompanying drawing which follows will more fully describe the operation and utility of the instant invention. Although the device is considered in one particular circuit configuration, it is to be understood that this embodiment is merely representative, being chosen for purposes of explanation and illustration, and is not to be construed as defining the limits of the invention.

The drawing shows a simplified arrangement of the invention as utilized in a direct read-out oscilloscope.

As illustrated in the FIGURE, a multivibrator 10 and cathode follower 12 supply a single-ended read-out dot generating pulsed signal 14, which is at a particular direct voltage level 16. This signal is inserted through one position of polarity inversion switch 18 into the input grid 20 of a first direct coupled tube 22 of a balanced push-pull type cathode follower circuit. A direct voltage source 24 supplies another adjustable direct voltage base level or index dot reference signal through the lower portion of switch 18 to grid 26 of a symmetrical second tube 28. Position control 30, connected to ground or a common reference point, changes the bias or potential level on the respective tubes and permits the alternating or dot generating read-out signal and the base or reference level to be moved together with respect to ground.

The alternating and direct voltage signals which are maintained separately in the upper and lower cathode follower push-pull type tubes are then coupled directly from the respective cathodes of tubes 22 and 28 into the grids of cathode coupled paraphrase amplifier tubes 32 and 34, wherein the two signals are combined to produce a symmetrical push-pull or balanced output. Common cathode resistor 35 provides the signal coupling action between the two sections. Output of the latter tubes is then fed into a common load circuit 36 wherein the read-out signal is combined, on a time sharing basis, with the normal symmetrical push-pull type display signal which is to be analyzed. Resistor 38 is used to calibrate the amplitude relationship of the two time shared signals, while resistors 40 are used to position the entire combined display. Thereafter the common balanced output signal from the load is connected to properly drive the vertical deflection plates of the cathode ray tube, with one period of operation applying the display signal and the alternate period superimposing the read-out or measuring signal and reference level.

The time sharing action is provided by switch gate 42 which alternately applies the pulsed output of a multivibrator to the connected common cathodes of paraphase read-out signal amplifier 32, 34 and to the display signal amplifier 44 to cause conduction and cutoff of each amplifier channel, respectively, so that output of only one channel is applied at a given time to the common load and deflection plates. A further discussion of the operation of this circuit is found in a copending application entitled "Time Sharing Oscilloscope," Serial No. 55,014, filed September 9, 1960, in the name of the instant inventor and assigned to the same assignee as the present application.

In order to be able to analyze characteristics of signals of either polarity, the polarity reversal switch 18 is provided. This switch merely reverses the inputs to the two tubes 22 and 28. Thus, when the switch position is changed, the direct voltage base level is applied to grid 20 and the read-out signal is applied to grid 26. This inverts the read-out signal with respect to the base level so that negative appearing signals may be more easily seen and analyzed on the cathode ray tube face. The polarity reversal may also be accomplished in the output cathode circuit if so desired. Thus, each half circuit including both pairs of tubes 22 and 28, and 32 and 34, are made symmetrically identical and are capable of accepting either the direct voltage base level or the alternating read-out signal.

The instant novel arrangement may similarly be utilized in other applications wherein it is desirable to combine separately adjustable unsymmetrical alternating and direct voltage input signals in a stable balanced symmetrical system providing push-pull type outputs. In addition, equivalent transistor configurations may be employed in place of tubes.

While only one embodiment has been illustrated, it is to be understood that the instant invention is not limited to the exact form or use indicated, and that many variations may be made in the particular design and configuration without departing from the scope of the instant invention as set forth in the appended claims.

What is claimed is:

1. A direct coupled paraphase amplifier circuit comprising a pair of balanced symmetrical amplifiers, each said amplifier having input, output and common electrodes; input means providing two separate independently adjustable unsymmetrical input signals, polarity reversal means connected between said input means and said input electrodes to cause each said unsymmetrical input signal to be disconnected from its respective input electrode and applied to the other said input electrode; means connecting together said common electrode; common reference means; common resistive means connected between said common electrodes and said reference means to provide signal coupling between said amplifiers and to cause said two input signals to be combined at said output electrodes; utilization means; output means providing output signals from each said amplifier output electrode into said utilization means, each said amplifier output signal being oppositely phased and symmetrical with respect to said common reference.

2. The device of claim 1 including means connected between said input means and said input electrodes for controlling the potential levels of both said input signals together with respect to said reference.

3. The device of claim 1 wherein one of said input signals comprises a direct voltage bias level and the other comprises an alternating voltage.

4. The device of claim 3 including means for combining said output signals with a third signal for application to said utilization device, said third signal comprising two equal oppositely phased symmetrical portions.

5. The device of claim 4 including a controllable signal-translating channel for said third signal and switching means connected to cut off said pair of amplifiers and said channel alternately to cause said output signals to be applied to said utilization means on a time sharing basis alternately with said third signal.

6. The device of claim 5 wherein said utilization means comprises display means for displaying all said signals and said means for controlling potential levels comprises position control means whereby measurements of said third signal display may be made by positioning said output signal displays with respect thereto.

7. The device of claim 6 wherein said alternating input signal comprises a rectangular dot generating read-out pulse, said pulse being included in said output signals and appearing as dots to permit measurement of said third signal display on said display means.

8. The device of claim 6 including means to calibrate the amplitude relationship of said time shared signal displays on said display means.

9. The device of claim 8 including means to adjust the position of said combined output and third signal displays on said display means.

References Cited in the file of this patent

UNITED STATES PATENTS

| | | |
|---|---|---|
| 2,466,207 | Carpentier | Apr. 5, 1949 |
| 2,755,410 | Schlesinger | July 17, 1956 |
| 2,805,390 | Patrick et al. | Sept. 3, 1957 |
| 2,826,717 | Maron | Mar. 11, 1958 |